H. R. HEYL.
Apparatus for Molding Suppositories.
No. 214,775. Patented April 29, 1879.
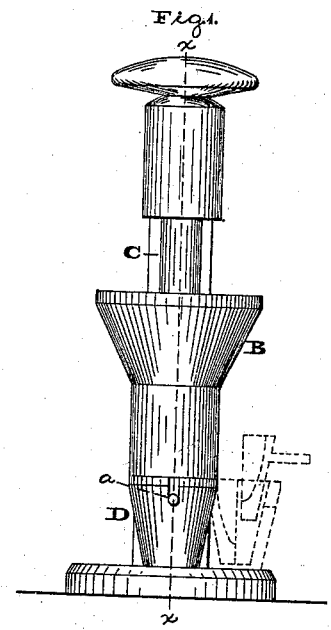
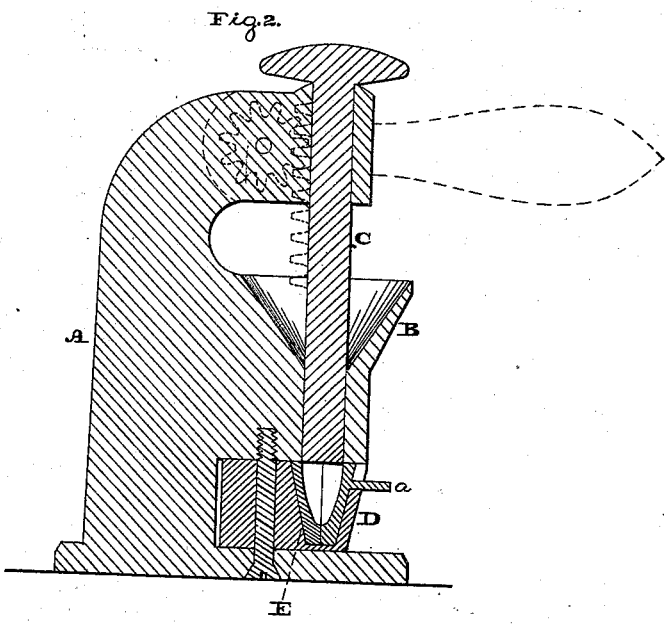
Witnesses:
A. P. Grant,
W. A. Kicker
Inventor:
Henry R. Heyl,
by John A. Wiedersheim
ATTORNEY.

UNITED STATES PATENT OFFICE.

HENRY R. HEYL, OF PHILADELPHIA, PENNSYLVANIA, ASSIGNOR TO HENRY C. ARCHIBALD, OF SAME PLACE.

IMPROVEMENT IN APPARATUS FOR MOLDING SUPPOSITORIES.

Specification forming part of Letters Patent No. 214,775, dated April 29, 1879; application filed March 3, 1879.

*To all whom it may concern:*

Be it known that I, HENRY R. HEYL, of the city and county of Philadelphia, and State of Pennsylvania, have invented a new and useful Improvement in Apparatus for Molding Suppositories, which improvement is fully set forth in the following specification and accompanying drawings, in which—

Figure 1 is a front elevation of the apparatus embodying my invention. Fig. 2 is a vertical section in line $x\ x$, Fig. 1.

Similar letters of reference indicate corresponding parts in the two figures.

My invention has for its object an apparatus adapted for druggists' use for quickly making suppositories, in lieu of the present expensive and inconvenient method.

The invention consists of a mold constructed of longitudinal sections, capable of separation by lengthwise movements, and seated within a shifting flask, whereby the suppository, when formed, may be readily released and ejected.

It also consists of the combination of a sectional mold, a shifting flask, and hopper, so constructed and disposed that the mold as it is shifted shears with the lower part of the hopper, thus cutting off the suppository even with the top of the mold, and insuring uniformity in the size and contents of the suppository.

Referring to the drawings, A represents a frame or arm, supporting a hopper, B, into which is fitted a plunger, C, guided in a boss at the top of the arm, said plunger being depressed and elevated in any suitable manner—as, for example, by rack and pinion, as shown in Fig. 2 of drawings. Below the hopper is a space, in which is received a flask, D, which is made shiftable, in order to be moved under and from the bottom of the hopper. In the present case the flask is pivoted to the frame or arm A by means of a vertical bolt, which is passed through the base of said arm, the back of the flask, and portion of the hopper.

Within the flask D is placed the mold E, which, communicating with the hopper B, is constructed of two or more longitudinal vertical sections, the contour of the inner face of which conforms to the shape of the suppository to be formed, and, preferably, of fine metal, that will admit of a high degree of polish.

To one or each section of the mold is secured a pin, $a$, which projects horizontally through a vertical slot in the flask D, whereby the sections may be readily removed by lifting them from the mold.

It will be noticed that the tops of the mold E and flask D are flush with the bottom or neck of the hopper.

The operation is as follows: The plunger is elevated and the hopper supplied with suppository material, which flows into the mold E, or is forced thereinto by the plunger C. Power is exerted on the plunger, so as to compress the material in the mold, and the flask is then shifted from under the neck or bottom of the hopper, in which operation the two fitting surfaces of the mold and flask and the hopper shear off the suppository even with the top of the mold, thus cutting off the material and insuring uniformity in the size and contents of the suppositories. A section of the mold is now lifted from the flask—say, by means of the pin or handle $a$—and it carries with it the suppository, which is thereby released and ejected, as is evident. The section is then restored to the flask, and the latter returned to its normal position, whereby the operations may be repeated.

Owing to the brittle nature of the substance from which the suppository is made, even when compact or compressed under great pressure, it is requisite to employ a mold that will discharge the suppository without breaking it. This is accomplished by the sectional mold E, as stated.

It will be noticed that while only one section of mold is necessarily withdrawn from the flask by a lengthwise movement, and the other section is secure within the same, I obtain all the advantages of a mold which is entirely removable from the flask, and whose sections require subsequent separation.

Having thus described my invention, what I claim as new, and desire to secure by Letters Patent, is—

1. The mold E, constructed of longitudinal sections capable of being separated by lengthwise movements, and seated within a shifting holder, substantially as and for the purpose set forth.

2. The combination of the sectional mold and shifting flask with the hopper, substantially as described, whereby the mold as it is shifted shears with the lower part of the hopper, substantially as and for the purpose set forth.

3. The hopper B, plunger C, separable mold E, and shifting flask D, combined and operating as described, and forming an improvement in apparatus for molding suppositories, as stated.

HENRY R. HEYL.

Witnesses:
JOHN A. WIEDERSHEIM,
H. E. GARSED.